(12) United States Patent
Sata

(10) Patent No.: US 6,635,725 B1
(45) Date of Patent: Oct. 21, 2003

(54) METHOD FOR PRODUCING ETHYLENE-VINYL ACETATE COPOLYMER AQUEOUS EMULSION

(75) Inventor: Tomoaki Sata, Toyonaka (JP)

(73) Assignee: Sumitomo Chemical Company, Ltd., Osaka (JP)

( * ) Notice: Subject to any disclaimer, the term of this patent is extended or adjusted under 35 U.S.C. 154(b) by 186 days.

(21) Appl. No.: 09/671,602

(22) Filed: Sep. 28, 2000

(30) Foreign Application Priority Data

Sep. 30, 1999 (JP) .......................................... 11-278852
Jan. 27, 2000 (JP) ....................................... 2000-018599

(51) Int. Cl.⁷ ............................. C08F 2/22; C08F 4/40; C08F 4/06; C08F 4/629; C08F 218/08
(52) U.S. Cl. ......................... 526/91; 526/93; 526/210; 526/213; 526/229; 526/331; 526/915; 526/216
(58) Field of Search ................................ 526/210, 213, 526/229, 331, 915, 93, 41, 216

(56) References Cited

U.S. PATENT DOCUMENTS 3,560,454 A * 2/1971 Büning et al. ................. 526/64
5,540,987 A * 7/1996 Mudge et al. ............... 428/288
5,633,334 A * 5/1997 Walker et al. ............... 526/202

FOREIGN PATENT DOCUMENTS

EP 0 191 460 2/1986
JP 2629017 4/1997

* cited by examiner

Primary Examiner—Kelechi Egwim
(74) Attorney, Agent, or Firm—Fitch, Even, Tabin & Flannery

(57) ABSTRACT

A method for producing an ethylene-vinyl acetate copolymer aqueous emulsion is provided which uses a redox catalyst comprising a transition metal salt and an erysorbic acid and/or an ascorbic acid, as the reducing agent thereof, and 1.8 to 10 mol of hydrogen peroxide, as an oxidizing agent thereof, per one mol of the erysorbic acid and the ascorbic acid, and by this method, an ethylene-vinyl acetate copolymer aqueous emulsion which causes no generation of formalin and in which discoloration is suppressed can be obtained.

4 Claims, No Drawings

METHOD FOR PRODUCING ETHYLENE-VINYL ACETATE COPOLYMER AQUEOUS EMULSION

BACKGROUND OF THE INVENTION

The present invention relates to a method for producing an ethylene-vinyl acetate copolymer aqueous emulsion. More specifically, the present invention relates to a method for producing an ethylene-vinyl acetate copolymer aqueous emulsion which uses a redox catalyst in which the reducing agent comprises a transition metal salt and an erysorbic acid and/or an ascorbic acid and the oxidizing agent comprises a specific amount of hydrogen peroxide.

Conventionally, an ethylene-vinyl acetate copolymer aqueous emulsion has been produced by using a redox catalyst consisting of an oxidizing agent and a reducing agent. For example, as the reducing agent, a transition metal and formaldehyde-sodium bisulfite are often used. As the oxidizing agent to be combined with the reducing agent, sodium persulfate, hydrogen peroxide, t-butyl hydro peroxide and the like are frequently used.

However, when formaldehyde-sodium bisulfite and the like are used as a reducing agent component, formalin which is said to be the main cause of sick house syndrome is generated from the resulted aqueous emulsion, meaning an undesirable phenomenon from the hygienic standpoint.

On the other hand, when erysorbic acids, ascorbic acids or the like is used as a reducing agent component instead of formaldehyde-sodium bisulfite and the like for solving the above-mentioned problem, the resulted emulsion may be discolored in some cases.

The present inventors have intensively studied for solving the above-mentioned problem when using erysorbic acid, ascorbic acids and the like as a reducing agent component. As the result, they have found that discoloration of the resulted emulsion can be suppressed by using a specific oxidizing agent, hydrogen peroxide, as the oxidizing agent to be combined, in a specific amount of 1.8 to 10 mol per 1 mol of the reducing agent component. Based on this finding, the present invention was completed.

SUMMARY OF THE INVENTION

The present invention provides a practically excellent method for producing an ethylene-vinyl acetate copolymer aqueous emulsion which uses a redox catalyst comprising a transition metal salt and an erysorbic acid and/or an ascorbic acid, as the reducing agent thereof, and 1.8 to 10 mol of hydrogen peroxide, as an oxidizing agent thereof, per one mol of the erysorbic acid and the ascorbic acid.

DETAILED DESCRIPTION OF THE PREFERRED EMBODIMENTS

The present invention is characterized in that the above described specific redox catalyst is used. The specific redox catalyst comprises a reducing agent and an oxidizing agent, and the reducing agent comprises a transition metal salt and an erysorbic acid and/or an ascorbic acid, and the oxidizing agent comprises hydrogen peroxide.

Examples of the reducing agent components, erysorbic acids and ascorbic acids, include erysorbic acid, ascorbic acid, and alkali metal salts thereof such as sodium salts, potassium salts. Among them, sodium salts are preferable, and particularly, sodium erysorbate is preferably used.

The reducing agent component is usually used in an amount of 0.02 to 1.0% by weight based on vinyl acetate. When the amount is less than 0.02 wt %, the reaction may not occur in some cases. When the amount exceeds 1.0 wt %, the produced emulsion may be colored, and the performances of the resulted emulsion, for example, the strength, water-resistance and the like of a film made of this emulsion, may deteriorate, meaning undesirable phenomena.

Examples of the transition metal salt include chlorides, sulfates and the like of iron, copper, cobalt, titanium, nickel, chromium, zinc, manganese, vanadium, molybdenum, cerium and the like. Among them, ferrous chloride, ferrous sulfate, copper sulfate and the like are preferably used.

The transition metal salt is used usually in an amount of about 0.001 to 0.05 time by weight based on the reducing agent component, erysorbic acids and ascorbic acids. When the amount is less than 0.001 time by weight, the reaction may not occur. When the amount exceeds 0.05 time by weight, the produced emulsion may be colored, meaning an undesirable phenomenon.

In the present invention, hydrogen peroxide as the oxidizing agent is used in an amount of 1.8 to 10 mol per one mol of the total amount of erysorbic acids and ascorbic acids. This amount is preferably 2 to 7 mol per one mol of the total amount of erysorbic acids and ascorbic acids. When the mount is less than 1.8 mol, the resulted emulsion is discolored. When the amout exceeds 10 mol, the performances of the resulted emulsion, for example, the strength, water-resistance and the like of a film made of the emulsion, deteriorate.

Monomers which can be copolymerized with ethylene and vinyl acetate may also be used, as the raw material monomer, in addition to ethylene and vinyl acetate. Examples of the monomers which can be copolymerized with them include vinyl esters such as vinyl propionate, vinyl butyrate, vinyl pivalate, vinyl laurate, vinyl isononanoate and vinyl versatate, halogenated vinyls such as vinyl chloride and vinyl bromide, (meth)acrylates such as 2-ethylhexyl (meth)acrylate, n-butyl (meth)acrylate, ethyl (meth)acrylate and methyl (meth)acrylate, maleates, crotonates, itaconates, and mixtures thereof.

Further, monomers having a functional group such as (meth)acrylic acid, crotonic acid, maleic acid, itaconic acid, acrylamide, N-methylolacrylamide, N-butoxymethylacrylamide, 2-hydroxyethyl methacrylate, glycidyl methacrylate, allyl sulfonate, vinyl sulfonate, triallyl cyanurate, triallyl isocyanurate, diallyl phthalate, and salts thereof, and the like can be used as the monomer which can be copolymerized with them.

The ratio by weight of an ethylene unit to a vinyl acetate unit in the copolymer is usually from about 5/95 to 40/60. The effects of the present invention are realized particularly in the copolymer in which the ratio by weight of an ethylene unit to a vinyl acetate unit is from about 10/90 to 30/70.

When, a copolymerizable monomer unit is contained, it is usually contained in an amount of 0.1 to 10 times by weight based on the vinyl acetate unit.

For producing an ethylene-vinyl acetate copolymer aqueous emulsion by co-polymerizing the above monomers, an emulsion polymerization method is adopted. As an example of the method, following method is mentioned.

A vinyl acetate monomer, a copolymerizable monomer if used, a transition metal salt, and a partially saponified polyvinyl alcohol and the like as an emulsifier are charged in a pressure proof reaction vessel. After heating to about 40–70° C., the reaction system is purged with ethylene to remove oxygen, then ethylene is further introduced to provide an inner pressure of about 1–7 Mpa. Thereafter, hydrogen peroxide and an aqueous solution of an erysorbic acid and/or an ascorbic acid, reducing agent components, are dropped sequentially to conduct an emulsion polymerization.

An organic peroxide can also be added in a small amount in the latter period of polymerization wherein the concentration of unreacted monomers have reached a value as low as several %. By this operation, the concentration of unreacted monomers can be reduced to several thousands ppm or lower in a relatively short period of time. Examples of the organic peroxide include tertial butyl perbenzoate, dilauryl peroxide, benzoyl peroxide and tertial butyl hydroperoxide. Such an organic peroxide is generally used in an amount of 0.0001–0.005 time by weight based on the weight of vinyl acetate.

The emulsifier used in the present invention is not particularly restricted. Examples thereof include polyvinyl alcohol, protective colloid such as hydroxyethylcellulose, methylcellulose and carboxymethylcellulose, nonionic surfactants such as a polyoxyethylene alkyl ether, polyoxyethylene alkylphenol ether, polyoxyethylenepolyoxypropylene block copolymer, polyoxyethylene fatty ester and polyoxyethylenesorbitan fatty ester, and anionic surfactants such as an alkyl sulfate, alkylbenzenesulfonate, alkylsulfosuccinate, alkyldiphenyl ether disulfonate, polyoxyethylenealkylsulfate and polyoxyethylenealkylphosphate.

EXAMPLE 1

Into a 5 L autoclave, the reaction vessel, was charged a solution prepared previously by dissolving 1900 g of vinyl acetate, 20 g of polyvinyl alcohol "Poval 217" (manufactured by Kuraray Co., Ltd., saponification degree; 88 mol %, average polymerization degree; 1700), 65 g of "Poval 205" (manufactured by Kuraray Co., Ltd., saponification degree; 88 mol %, average polymerization degree; 500), 0.05 g of ferrous sulfate heptahydrate, and 3.5 g of acetic acid in 1650 g of water. After inside of the reaction vessel was purged with nitrogen gas and heated to 60° C., the inside pressure was elevated to 4.6 MPa with ethylene. Then, 0.43% hydrogen peroxide aqueous solution and 10% sodium erysorbate aqueous solution were added to the reaction vessel at fixed speeds of 25 ml/h and 13.4 ml/h, respectively, to conduct the polymerization. The temperature in the reaction vessel was kept at 60° C. by controlling the temperature of the jacket. After 4 hours from the initiation of the polymerization, addition of 0.43% hydrogen peroxide aqueous solution was stopped and, instead, 30 ml of 8.75% hydrogen peroxide aqueous solution was added over 1 hour. The polymerization reaction was continued until the concentration of the remaining vinyl acetate monomer reached less than 1% by weight.

After termination of the reaction, the reaction vessel was cooled, the unreacted ethylene gas was removed, then, the reaction product was removed. An ethylene-vinyl acetate copolymer emulsion composed of 18% of ethylene and 82% of vinyl acetate, and having a resin nonvolatile content of 55% and a viscosity of 1200 mPa·s was obtained.

This emulsion was coated on white high grade paper at a thickness of 10 mil., and dried for 5 minutes in an oven at 90° C., and the colored degree (Yellow Index: Y.I.) was measured by a yellow index test. The results are shown in Table 1.

EXAMPLE 2

The same procedure as in Example 1 was conducted except that the reducing agent, 10% sodium erysorbate aqueous solution was replaced by a 9.2% sodium ascorbate aqueous solution. The results are shown in Table 1.

EXAMPLE 3

The same procedure as in Example 1 was conducted except that addition speed of the reducing agent, 10% sodium erysorbate aqueous solution, was changed to 21.6 ml/h. The results are shown in Table 1.

EXAMPLE 4

The same procedure as in Example 1 was conducted except that addition speed of the reducing agent, 10% sodium erysorbate aqueous solution, was changed to 7.3 ml/h. The results are shown in Table 1.

EXAMPLE 5

Into a 5 L autoclave, the reaction vessel, was charged a solution prepared previously by dissolving 1900 g of vinyl acetate, 40 g of polyvinyl alcohol "Poval 217", 70 g of partially saponified polyvinyl alcohol "C-500" (manufactured by Kuraray Co., Ltd., saponification degree; 96 mol %, average polymerization degree; 1800), 0.05 g of ferrous sulfate heptahydrate, and 3.5 g of acetic acid in 1500 g of water. After inside of the reaction vessel was purged with nitrogen gas and heated to 60° C., the inside pressure was elevated to 4.6 MPa with ethylene. Then, 0.6% hydrogen peroxide aqueous solution and 10% sodium erysorbate aqueous solution were added to the reaction vessel at fixed speeds of 30 ml/h and 10 ml/h, respectively, to conduct the polymerization. The temperature in the reaction vessel was kept at 60° C. by controlling the temperature of the jacket. After 5 hours from the initiation of the polymerization, addition of 0.43% hydrogen peroxide aqueous solution was stopped and, instead, 30 ml of aqueous solution containing 8.75% hydrogen peroxide and 1% tertiallybutyl hydroxy peroxide was added over 1 hour. The polymerization reaction was continued until the concentration of the remaining vinyl acetate monomer reached less than 1% by weight.

After termination of the reaction, the reaction vessel was cooled, the unreacted ethylene gas was removed, then, the reaction product was removed. An ethylene-vinyl acetate copolymer emulsion composed of 18% of ethylene and 82% of vinyl acetate, and having a resin nonvolatile content of 55% and a viscosity of 3000 mPa·s was obtained.

EXAMPLE 6

Into a 5 L autoclave, the reaction vessel, was charged a solution prepared previously by dissolving 1500 g of vinyl acetate, 30 g of polyvinyl alcohol "Poval 217", 60 g of "Poval 205", 0.05 g of ferrous sulfate heptahydrate, and 3.5 g of acetic acid in 1300 g of water. After inside of the reaction vessel was purged with nitrogen gas and heated to 60° C., the inside pressure was elevated to 6.0 MPa with ethylene. Then, 0.8% hydrogen peroxide aqueous solution and 5% sodium erysorbate aqueous solution were added to the reaction vessel at fixed speeds of 24 ml/h and 17 ml/h, respectively, to conduct the polymerization. The temperature in the reaction vessel was kept at 60° C. by controlling the temperature of the jacket. After 7 hours from the initiation of the polymerization, addition of 0.8% hydrogen peroxide aqueous solution was stopped and, instead, 60 ml of 8.75% hydrogen peroxide aqueous solution was added over 1 hour. The polymerization reaction was continued until the concentration of the remaining vinyl acetate monomer reached less than about 2% by weight.

After termination of the reaction, the reaction vessel was cooled, the unreacted ethylene gas was removed, then, the reaction product was removed.

To the reaction product, 30 ml of 0.85% tertiallybutyl hydroxy peroxide aqueous solution and 20 ml of 5% sodium erysorbate aqueous solution were added over 1 hour to obtain the final product.

An ethylene-vinyl acetate copolymer emulsion composed of 30% of ethylene and 70% of vinyl acetate, and having a resin nonvolatile content of 55% and a viscosity of 1100 mPa·s was obtained.

The same yellow index test as in Example 1 was conducted. The results are shown in Table 1.

COMPARATIVE EXAMPLE 1

The same procedure as in Example 1 was conducted except that addition speed of the reducing agent, 10% sodium erysorbate aqueous solution, was changed to 39.4 ml/h. The results are shown in Table 1.

COMPARATIVE EXAMPLE 2

The same procedure as in Example 2 was conducted except that addition speed of the reducing agent, 9.2% sodium ascorbate aqueous solution, was changed to 44.7 ml/h. The results are shown in Table 1.

COMPARATIVE EXAMPLE 3

The same procedure as in Example 1 was conducted except that the oxidizing agent, hydrogen peroxide, was replaced by sodium persulfate. The sodium persulfate was used in the same amount in molar as that of hydrogen peroxide in Example 1. The results are shown in Table 1.

TABLE 1

| No. | Oxidizing agent | Reducing agent component | Molar ratio *1 | Y.I. |
|---|---|---|---|---|
| Example 1 | Hydrogen peroxide | sodium erysorbate | 2.9 | 0.14 |
| Example 2 | Hydrogen peroxide | sodium ascorbate | 3.3 | 2.1 |
| Example 3 | Hydrogen peroxide | sodium erysorbate | 1.8 | 1.5 |
| Example 4 | Hydrogen peroxide | sodium erysorbate | 5.3 | 0.13 |
| Example 5 | Hydrogen peroxide | sodium erysorbate | 5.0 | 0 |
| Example 6 | Hydrogen peroxide | sodium erysorbate | 6.9 | 1.1 |
| Comparative Example 1 | Hydrogen peroxide | sodium erysorbate | 1.0 | 10 |
| Comparative Example 2 | Hydrogen peroxide | sodium ascorbate | 1.0 | 13 |
| Comparative Example 3 | Sodium persulfate | sodium erysorbate | 3.0 | 6 |

*1: Oxidizing agent/Reducing agent component

According to the present invention, an ethylene-vinyl acetate copolymer aqueous emulsion which causes no generation of formalin and in which discoloration is suppressed can be obtained, by using a redox catalyst containing an erysorbic acid and/or an ascorbic acid, as a reducing agent component, and hydrogen peroxide in specific amount as the oxidizing agent to be combined with the reducing agent.

What is claimed is:

1. A method for producing an ethylene-vinyl acetate copolymer aqueous emulsion comprising co-polymerizing monomers comprising ethylene and vinyl acetate by using a redox catalyst comprising a transition metal salt and an erysorbic acid, as the reducing agent thereof, and 1.8 to 10 mol of hydrogen peroxide, as an oxidizing agent thereof, per one mol of the erysorbic acid.

2. The method according to claim 1 wherein the ratio by weight of an ethylene unit to a vinyl acetate unit in the ethylene-vinyl acetate copolymer is from about 5/95 to 40/60.

3. The method according the claim 1 wherein the ratio by weight of an ethylene unit to a vinyl acetate unit in the ethylene-vinyl acetate copolymer is from about 10/90 to 30/70.

4. The method according to claim 1 wherein the amount of hydrogen peroxide is 2 to 7 mol per one mol of the erysorbic acid.

* * * * *